Figure 1:
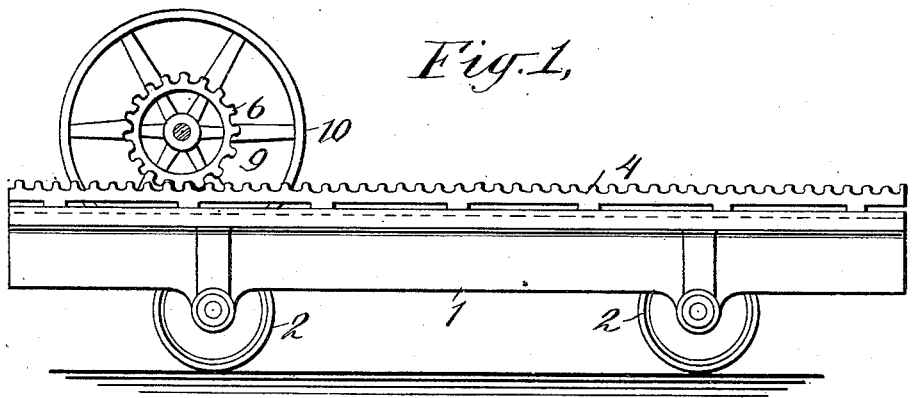

No. 695,284.  
G. K. CUMMINGS.  
METHOD OF MAKING PRISMATIC WINDOWS.  
(Application filed Nov. 30, 1901.)

Patented Mar. 11, 1902.

(No Model.)

3 Sheets—Sheet 1.

WITNESSES:
INVENTOR
George K. Cummings
BY
Kenyon & Kenyon
ATTORNEYS.

No. 695,284. Patented Mar. 11, 1902.
G. K. CUMMINGS.
METHOD OF MAKING PRISMATIC WINDOWS.
(Application filed Nov. 30, 1901.)
(No Model.) 3 Sheets—Sheet 2.
Fig. 5.
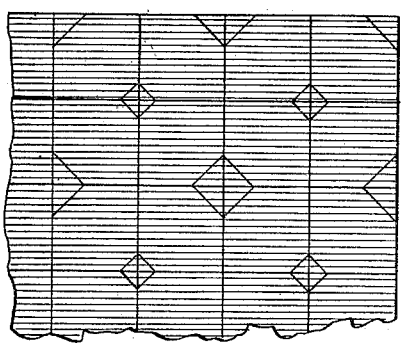
Fig. 4.
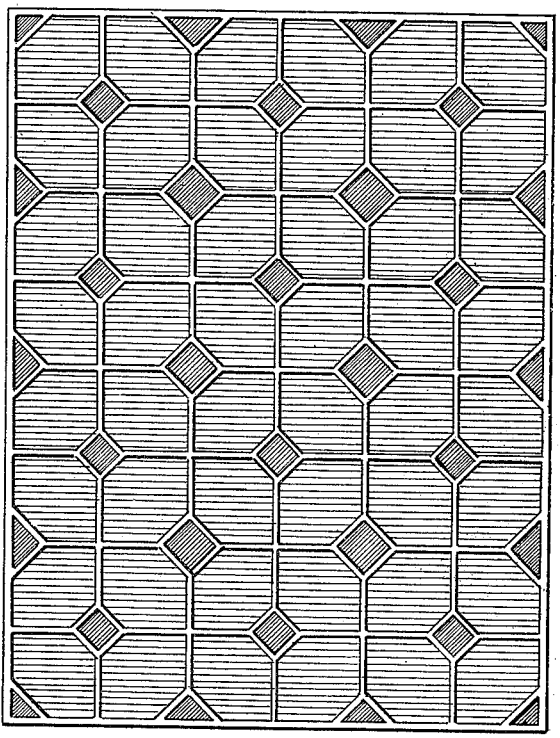
Fig. 7.
Fig. 6.
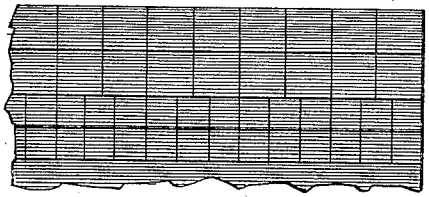
Fig. 8.
WITNESSES:
Edwin Segal
John O. Gempler
INVENTOR
George K. Cummings,
BY
Kenyon & Kenyon,
ATTORNEYS.

No. 695,284. Patented Mar. 11, 1902.
G. K. CUMMINGS.
METHOD OF MAKING PRISMATIC WINDOWS.
(Application filed Nov. 30, 1901.)

(No Model.) 3 Sheets—Sheet 3.

WITNESSES:

INVENTOR
George K. Cummings,
BY
Kenyon & Kenyon
ATTORNEYS.

UNITED STATES PATENT OFFICE.

GEORGE K. CUMMINGS, OF CENTER RUTLAND, VERMONT.

METHOD OF MAKING PRISMATIC WINDOWS.

SPECIFICATION forming part of Letters Patent No. 695,284, dated March 11, 1902.

Original application filed August 15, 1898, Serial No. 688,579. Divided and this application filed November 30, 1901. Serial No. 84,208. (No model.)

*To all whom it may concern:*

Be it known that I, GEORGE K. CUMMINGS, a citizen of the United States, residing in Center Rutland, in the county of Rutland and State of Vermont, have invented a new and useful Improvement in Methods of Making Prismatic Windows, of which the following is a full, clear, and exact specification, reference being had to the accompanying drawings, which form a part hereof.

My invention relates to a method of making prismatic windows from sheets or panes of glass which are provided with a series of prismatic projections on their surface, which sheets or panes of prismatic glass are adapted to be assembled and glazed together to form ornamental prismatic windows.

The object of my invention is to provide a simple and economical method of manufacturing such sheets or panes of prismatic glass so as to enable prismatic windows to be made therefrom in a great variety of designs and in designs of superior finish and artistic merit and without making it necessary for the manufacturer to provide a great variety of molds or to carry on hand a large stock of prismlights of different forms and shapes.

Another object of the invention is to enable these prismatic windows to be made easily, quickly, and economically.

My invention consists, first, in the method of making windows of prismatic glass, which consists in rolling the molten glass into a sheet having prismatic projections of the desired outline on its surface, annealing the sheet, cutting the sheet into panes of the desired outline, then assembling and glazing the panes, substantially as set forth.

In the best form of my invention patterns of the separate panes are applied to the sheet of prismatic glass in such a way that the prismatic projections of the panes will run in a predetermined direction relatively to one another in the completed window, and the panes are cut out according to the said patterns.

My invention consists also in the method of making ornamental prismatic windows by rolling the molten glass into a sheet having prismatic projections of the desired outline on its surface, then annealing this sheet-glass, then cutting it into panes of two or more different shapes in such a manner that when these panes are combined or glazed so as to form the finished window the prismatic projections of the panes which have the same shape will be parallel with one another, whereas the prismatic projections of the panes of one shape will run in a different direction from the prismatic projections of the panes of a different shape, as a result of which there will be two or more sets of panes, each set having its prismatic projections running in a different direction from that of the prismatic projections of the other set or sets of panes and the panes of each set having their prismatic projections running in the same direction—that is to say, parallel with one another. For example, assuming that three forms of panes of prismatic glass are to be used in the completed window they are so cut that when they are assembled in the window all the panes of the first shape will have parallel prismatic projections or prismatic projections running in the same direction. All the panes of the second shape will have parallel prismatic projections or prismatic projections running in the same direction; but the prismatic projections on the second set of panes will run in a different direction from the prismatic projections on the first set of panes. All the panes of the third set or shape will have parallel prismatic projections or prismatic projections running in the same direction; but the prismatic projections on these panes will run in a different direction from the prismatic projections on the first two sets of panes, and so on, according to the number of different shapes of panes to be employed in making the complete window. When the best form of my invention is put into practice, the glass is melted until it is of the proper consistency and is stirred just before it is rolled, so as to make the mass homogeneous in temperature.

My invention also consists of certain other steps and features hereinafter described and claimed.

Figure 2:
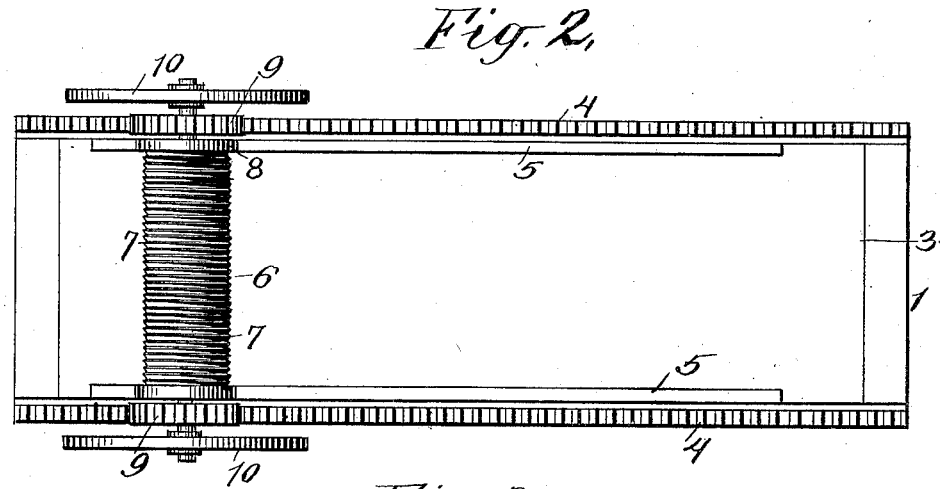
Figure 3:
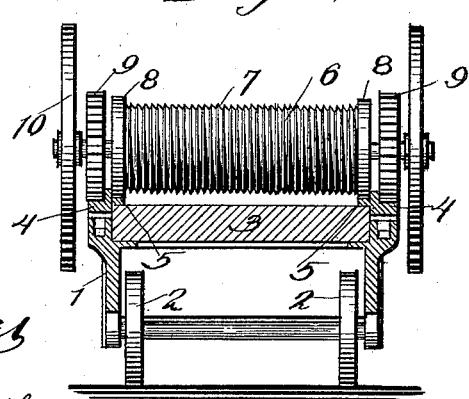
Figure 10:
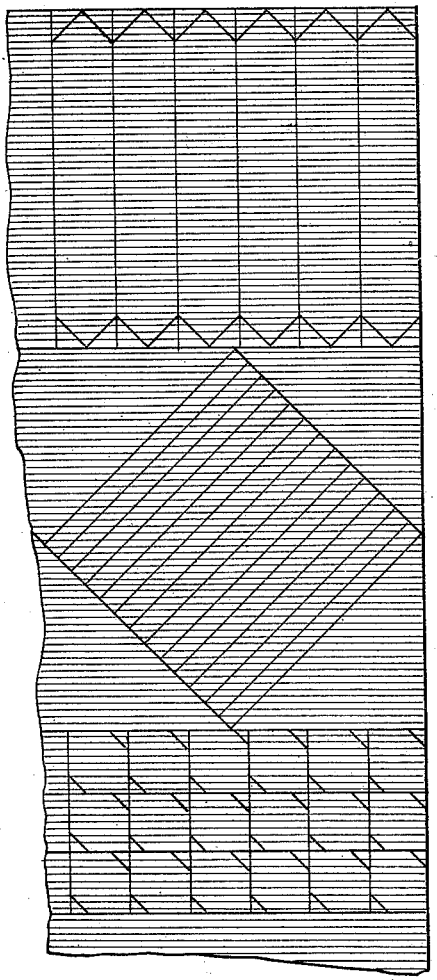
Figure 9:
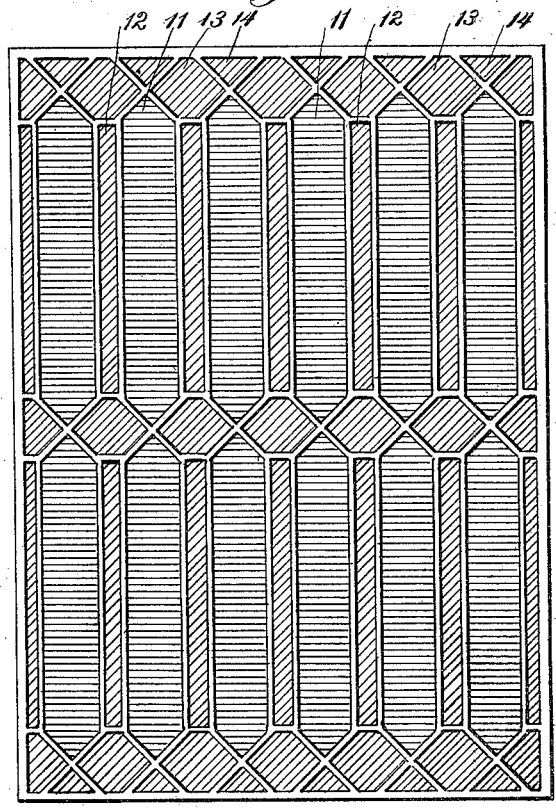

In Figures 1, 2, and 3 of the accompanying drawings I have shown an apparatus by means of which the first part of my method—to wit, the rolling of the glass—may be carried out. Fig. 1 is a side elevation of the machine. Fig. 2 is a plan view of the same, and Fig. 3 is a cross-sectional view thereof. Figs. 4 to 10 illustrate the method of cutting the panes of prismatic glass from a large sheet of rolled glass and shows how they are adapted to be assembled and glazed together in the finished window. Fig. 4 represents a finished window consisting of panes of prismatic glass made according to my improved method. Figs. 5 and 6 show sheets of rolled prismatic glass from which are cut the separate prism-panes, which are adapted when assembled and glazed to form the window shown in Fig. 4. Fig. 7 is a partial cross-sectional view of the sheet of glass shown in Fig. 5, showing the character of the prismatic projections on that sheet. Fig. 8 is a similar partial cross-sectional view of the sheet of glass shown in Fig. 6. Fig. 9 shows another design of prismatic window consisting of panes of prismatic glass made according to my improved method; and Fig. 10 shows a sheet of rolled prismatic glass and illustrates the manner of cutting therefrom the separate panes which are required to form the window represented in Fig. 9.

In carrying out my improved method the glass is first melted by any suitable means until it is of the proper consistency. It is then stirred just before it is rolled, so as to make the mass homogeneous in temperature. It is then rolled in any suitable manner into a sheet having on its surface prismatic projections of the desired outline and arrangement. In the best form of my invention the sheet is so rolled that the projections are parallel with one another. Any suitable mechanism or machine may be employed for rolling the glass. One form of apparatus suitable for this purpose is illustrated in Figs. 1 to 3, inclusive.

1 is a suitable framework, which is preferably mounted upon wheels 2, so that the machine can be conveniently moved from place to place. This framework carries the table 3, upon which the molten glass is poured and which serves to support the glass against the roller during the rolling operation. The table is provided with the racks 4 on the sides thereof.

5 5 are strips for regulating the thickness of the plate of prismatic glass which is produced by the machine. The surface of the table is plane.

6 is a roller provided with the continuous annular parallel ribs 7, which extend entirely around the roller. The plane of the ribs is parallel with the direction of motion of the roller and perpendicular to the plane of the glass plate to be formed. These ribs 7 are made to correspond in form with the depressions which it is desired to produce upon the upper side of the plate of glass. The roller is provided with a smooth bearing-surface 8 at its ends, adapted to rest and ride upon the strips 5.

9 9 are gears which are attached to the ends of the roller 6 and which are adapted to mesh with the racks 4.

10 10 are hand-wheels mounted on the ends of the roller, by means of which the roller is revolved and moved over the table 3.

In carrying out my method by means of this apparatus the roller and table are first heated so as to be brought to the proper temperature for operating upon the glass. One way of doing this is by pouring some of the molten glass preliminarily upon the roller and table until they are properly heated. The roller is moved to one end of the table and the molten glass is poured on the table in front of the roller, a sufficient quantity being supplied to the table to make a full sheet of prismatic glass. In order to make the mass of glass as nearly homogeneous as possible in temperature, it is then thoroughly stirred just before it is rolled. This can be done by any suitable means. The roller 6 is then rolled along the table, so as to roll the glass out into the form of a sheet having prismatic projections of the desired outline on its surface. These prismatic projections will be parallel with one another. The sheet of glass is then removed from the table and annealed. Any suitable form of leer or annealing-oven can be used for this purpose. It is important that the glass should be slowly and thoroughly annealed, because the sheet is irregular in cross-section and is therefore likely to break unless annealed with the greatest care. When the sheet of glass has been thus properly annealed and cooled, it is cut up into panes of the desired or necessary outline to form the completed window. This can be done by any suitable means. In the best form of my invention I proceed as follows: The finished window is to be made up of a certain number of panes of prismatic glass. These panes are made in two or more sets. The panes of each set are made of the same shape or outline; but the panes of one set have a different shape or outline from the panes of the other set or sets. This preferred form of my improved method is adapted for use when the completed window is to contain at least two different shapes of panes, and in most cases the window will be made up of a large number of variously-shaped panes. In cutting these panes out from the rolled sheet of prismatic glass any suitable means or method may be employed. I prefer to make a pattern of paper or any suitable material for each shape of pane that is to be used in the finished window, to apply these patterns to the surface or back of the sheet of prismatic glass, and to cut out the separate panes in accordance therewith. The separate panes are thus adapted to be combined or assembled in accordance with the design for the completed window, and when so combined or assembled they can be fastened and held in place by any suitable form of glazing or framework. Ordinarily metal bars are employed for the glazing of the panes, these bars being so shaped as to fit the panes and having grooves into which the edges of the panes project. This method of glazing is well known.

It is an essential feature of the best or preferred form of my improved method that at least two sets of differently-shaped panes should be cut from the sheet or sheets of prismatic glass and that they should be cut in such a way that when they are assembled and combined in the completed window the prismatic projections of all the panes having the same shape will be parallel with one another; but the prismatic projections of one set of panes will run in a different direction from the prismatic projections on the other set or sets of panes. As a result of this, there will be two or more different shapes of panes in the completed window, and all the panes of the same shape will tend to throw rays of light passing through them in the same or in a parallel direction, which will result in making all the panes of the same shape appear bright and luminous when looked at from that direction. As the panes of one shape send the light in one direction and the panes of another shape send the light in another direction, these two sets of panes will present a different effect or appearance from whatever point they may be viewed. Thus the panes of one shape will all be luminous, while the panes of another shape are dark or are less brilliantly lighted up. In this way beautiful effects can be produced and the general design of the window can be made to stand out more vividly and effectively.

In Figs. 4 to 8, inclusive, I have indicated one way of carrying out my improved method. Fig. 4 represents the finished window which it is proposed to make. It will be observed that this window is made up of two different shapes of panes. The design for the window having been first prepared, as shown in this figure, the pattern is made for each of its component panes, or one for each different shape or size of pane. These patterns are then applied to the sheet of rolled prismatic glass, as illustrated in Figs. 5 and 6, and the separate panes are cut out in accordance therewith and so as to leave as small an amount of waste glass as possible. The square panes are provided with small prismatic projections and are cut out from a sheet of glass having projections of this character, such as shown in Figs. 6 and 8. The hexagonal panes are provided with larger prismatic projections and are cut out from a sheet of glass such as is represented in Figs. 5 and 7. These panes are then adapted to be assembled and glazed together, as shown in Fig. 4. It will be seen that the patterns in Figs. 5 and 6 are so applied to the glass that when the panes are cut out and properly combined and assembled the prismatic projections on panes of the same shape will all be parallel, whereas the prismatic projections on the square panes will run in a different direction from the prismatic projections on the hexagonal panes.

In Figs. 9 and 10 I have illustrated another way of carrying out my improved method. Fig. 9 represents the design of window that is to be produced. Fig. 10 represents a sheet of rolled prismatic glass from which all these panes are cut. The window is to be composed of four different shapes of panes, (marked 11, 12, 13, and 14, respectively.) These panes are so cut out that when they are assembled in the proper manner in the finished window the panes 11 will have their prismatic projections running in the same direction, and the panes 12, 13, and 14 will have their prismatic projections running in the same direction with one another, but in a different direction from that of the prismatic projections of the panes 11.

Some of the advantages resulting from my improved method are as follows: A great variety of designs can be embodied and produced without requiring the manufacturer or maker to constantly carry on hand a large stock of prismatic lights of different shapes and sizes. Moreover, these different designs can be made easily and economically. Very beautiful effects can be produced by introducing into the finished windows different shapes of panes and giving to each shape a different appearance or effect, resulting from the fact that its prismatic projections are made to run in a special direction different from that of the prismatic projections on some of the other panes. It is thus possible to bring out the design of a prismatic window with striking effect and to produce a much more vivid impression by the contrast in light effects caused by having the prisms of differently-shaped panes run in different directions.

This application is filed as a division of my previous application, Serial No. 688,579, filed by me on August 15, 1898.

I do not herein claim the machine for rolling sheets of prismatic glass, as this machine is claimed in a separate application, Serial No. 681,011, filed by me May 18, 1898.

I do not herein claim the improved product—that is to say, the prismatic window—as I have claimed the said product in the application of which this present application is a division—to wit, Serial No. 688,579, filed by me August 15, 1898.

What I claim as new, and desire to secure by Letters Patent, is—

1. The method of making windows of prismatic glass which consists in rolling the molten glass into a sheet having prismatic projections of the desired outline on its surface, annealing the sheet, cutting the sheet into panes of the desired outline, then assembling and glazing the panes, substantially as set forth.

2. The method of making windows of prismatic glass which consists in rolling the molten glass into a sheet having prismatic projections of the desired outline on its surface, annealing the sheet, applying patterns of the separate panes to the sheet in such a way that the prismatic projections of the panes will run in a predetermined direction relatively to one another in the completed window, cutting the panes out according to the said patterns, and assembling and glazing the panes, substantially as set forth.

3. The method of making prismatic windows which consists in rolling the molten glass into a sheet having prismatic projections of the desired outline on its surface, annealing the sheet, cutting the sheet into panes of two or more different shapes, combining the panes to form the window, the prismatic projections of the panes having the same shape being parallel and there being at least two sets of panes having the prismatic projections of one set running in a different direction from the prismatic projections of the other set, substantially as set forth.

4. The method of making prismatic windows which consists in melting the glass until it is of the proper consistency, stirring it just before it is rolled so as to make the mass homogeneous in temperature, rolling the molten glass into a sheet having prismatic projections of the desired outline on its surface, annealing the sheet, and cutting the sheet into panes of two or more different shapes, combining these panes to form the window, the prismatic projections of the panes having the same shape being parallel and there being at least two sets of panes having the prismatic projections of one set running in a different direction from the prismatic projections of the other set, substantially as set forth.

5. The method of making prismatic windows which consists in rolling the molten glass into a sheet having parallel prismatic projections of the desired outline on its surface, annealing the sheet, cutting the sheet into panes of different shapes, and combining the panes to form a window, the prismatic projections of panes having the same shape being parallel, and the prismatic projections of panes having different shapes being made to run in different directions, substantially as set forth.

6. The method of making prismatic windows which consists in melting the glass until it is of the proper consistency, stirring it just before it is rolled so as to make the mass homogeneous in temperature, rolling the molten glass into a sheet having parallel prismatic projections of the desired outline on its surface, annealing the sheet, cutting the sheet into panes of different shapes and combining these panes to form the window, the prismatic projections of panes having the same shape being parallel, and the prismatic projections of panes having different shapes being made to run in different directions, substantially as set forth.

In testimony whereof I have signed my name to this specification in the presence of two subscribing witnesses.

GEORGE K. CUMMINGS.

Witnesses:
 G. A. BROWN,
 EDWIN SEGER.